Figure 3:
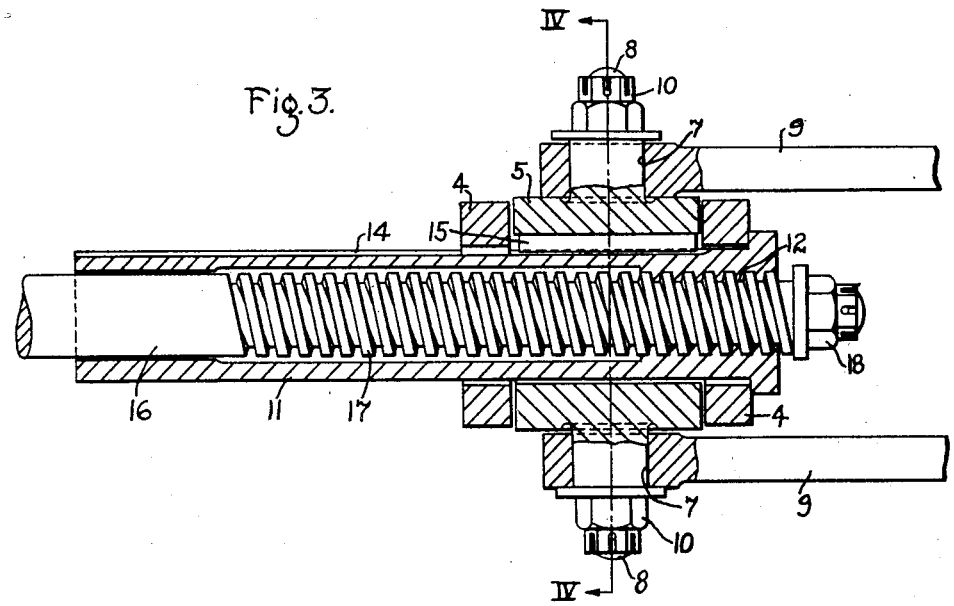

April 10, 1928.
C. N. F. KNAPÈ
AIR BRAKE MECHANISM
Filed Oct. 24, 1923
1,665,928
2 Sheets-Sheet 1
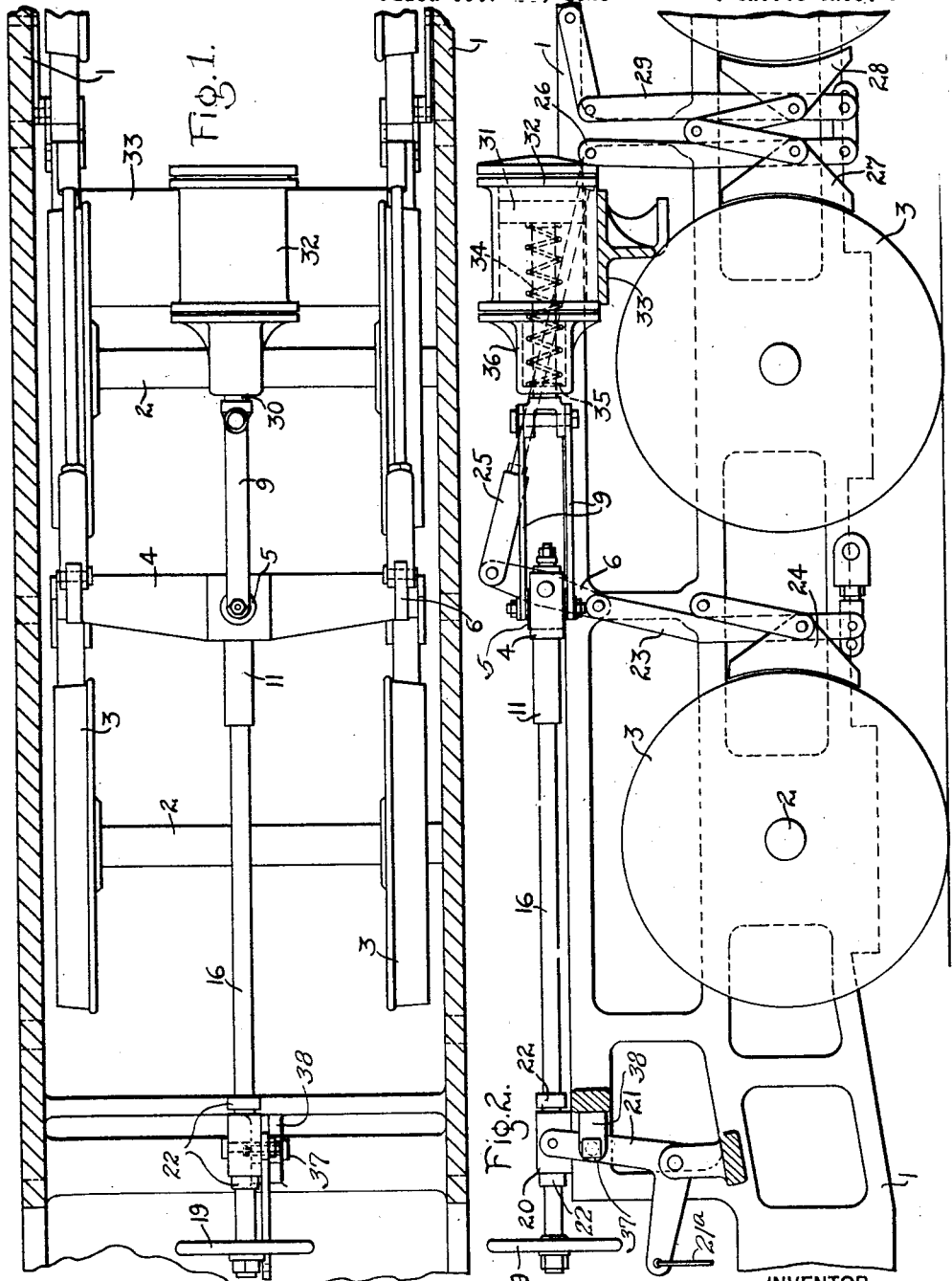
WITNESSES:
R. J. Butler
W. B. Jaspert
INVENTOR
Charles N. F. Knapè.
BY
Wesley G. Carr
ATTORNEY April 10, 1928.  1,665,928

C. N. F. KNAPÈ

AIR BRAKE MECHANISM

Filed Oct. 24, 1923  2 Sheets-Sheet 2

WITNESSES:
R. J. Butler
W. B. Jaspert

INVENTOR
Charles N. F. Knapè.
BY
ATTORNEY

Patented Apr. 10, 1928.

1,665,928

UNITED STATES PATENT OFFICE.

CHARLES N. F. KNAPE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

AIR-BRAKE MECHANISM.

Application filed October 24, 1923. Serial No. 670,527.

My invention relates to braking mechanisms, more particularly to brake mechanisms for railway vehicles.

It is among the objects of my invention to provide a braking mechanism for railway vehicles which shall be adapted to be either mechanically or manually actuated, which shall be of simple, compact and durable mechanical construction, and which shall be applicable to railway vehicles in general, but especially to the smaller vehicles, such as mine locomotives.

Various types of semi-automatic and both mechanically and manually actuated braking mechanisms have been employed in the past for stopping or retarding the motion of railway vehicles, which mechanisms generally operated on the lever principle, utilizing fluid pressure, spring or solenoid actuating means.

My present invention is directed to a braking mechanism which may be operated by fluid-pressure-actuated means or manually operated by the familiar hand-wheel screw-shaft adjustment. The device is so arranged that the hand-wheel may be operated independently of the pressure-actuated member, but the mechanism comprising the latter also functions in releasing the brake member, as will be hereinafter more fully described.

Figure 4:
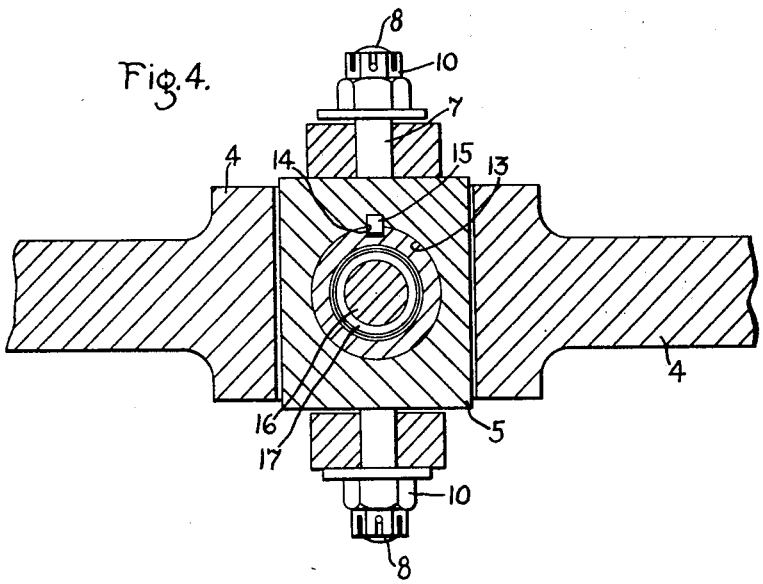

In the accompanying drawing constituting a part hereof and in which like reference characters designate like parts:

Fig. 1 is a plan view, partially in cross-section, of a fragmentary portion of a railway vehicle embodying the principles of my invention, Fig. 2 is a side elevational view thereof, Fig. 3 is a view, partially in cross-section and partially in elevation of the brake beam and the linkage connecting the manually adjustable screw and the liquid-pressure actuating device, and Fig. 4 is a cross-sectional view thereof taken along the line IV—IV of Fig. 3.

Referring to Fig. 1, the apparatus therein illustrated comprises a pair of side frames 1, together with the usual wheel axle construction, comprising a pair of axles 2 having flanged wheels 3 mounted on the respective ends thereof, said axles being journaled in the frames 1 in any suitable manner, as by the standard journal box and pedestal jaw construction, which permits of relative vertical movement of the wheels and frame.

The brake mechanism comprises a brake beam 4 having a trunnion member 5 mounted in the center thereof, the respective ends of the beam 4 being pivotally connected to a plurality of links 6. The trunnion member 5 is provided with projecting bearing portions 7 having screw-thread ends 8. (See Figs. 3 and 4.) A pair of links 9 are pivotally mounted on the bearing 7 and are secured against lateral movement by flanged nuts 10 that are screwed on the ends 8. An elongated sleeve member 11, having an internally screw-threaded end or shoulder 12, is disposed in an opening 13 that extends through brake beam 4 and trunnion 5.

The sleeve 11 is provided with a slot or key-way 14, which is in sliding engagement with a key 15 that is secured in the trunnion 5. This spline engagement permits of longitudinal movement of the sleeve 11 within the opening 13, but prevents rotation thereof. A screw shaft 16, having a threaded end 17 and a stop nut 18 on one end thereof, is screwed in the threads 12 of the sleeve member 11. The shaft 16 is provided with a hand-wheel 19 on its other end and is rotatably mounted in a longitudinally movable journal bearing 20 that is pivotally connected to a bell crank 21. Stop collars 22 are provided on the shaft 16 to engage the bearing 20 when the screwshaft is actuated, and a cable 21a is secured to the bell crank 21 for providing an operative connection with a second locomotive or to hold the bell crank 21 stationary as will be hereinafter explained.

Each brake beam link 6, on one end, is pivotally connected to a plurality of links 23, which are suitably pivoted to one of the brake shoes 24. The brake shoes are adapted to engage one set of the wheels 3 approximately in the horizontal plane including the longitudinal center line of the wheel axles 2. The upper ends of the links 6 are pivotally connected to brake rods 25, which are pivotally joined to suitable links 26 to operate brake shoes 27 and 28 that engage other sets of the wheels 3. For this purpose, the links 26 are connected to other links 29, which have one end pivoted to the vehicle frame 1.

The links 9, which are pivotally connected to the trunnions 5, are secured to a piston rod 30 having a piston head 31 disposed within a cylinder 32 that is mounted on the transom 33 of the vehicle frame 1. A coil spring 34 is disposed around the piston rod 30, one end of the spring being in engagement with the piston head 31 and its other end being adapted to engage the constricted end wall 35 of an extension or end bracket 36 of the cylinder 32. The cylinder 32 may be connected to a suitable source of fluid pressure, such as air, steam, or an hydraulic source of energy (not shown).

The operation of my device is briefly as follows: The brake beam 4 is operated by connecting the cylinder 32 to the source of fluid pressure, which actuates the piston 31 in opposition to the coil spring 34, putting the latter under compression and advancing the links 9 in a direction towards the hand-wheel end of the shaft 16. The movement of the brake beam 4 suitably operates the brakes 24, 27 and 28 through the connecting links 23, 26 and 29 respectively, causing the brake shoes to engage the outer periphery of the wheels 3. To release the brakes, the pressure on the piston head 31 is released and the energy of the compressed coil spring 34 reverses the links 9 to cause the brake beam 4 to move in the opposite direction, thereby lifting the brake shoes away from the wheels.

If it is desired to operate the brakes by the hand-screw 16, the bell crank 21 is held stationary by the cable 21a or by other suitable means, such as a pin or bolt 37 that may be inserted through suitable holes in the bell crank 21 and a lug 38 on the frame 1. The fluid pressure is shut off and the hand-wheel 19 is rotated to draw the shoulder 12 of the sleeve 11 against the beam 4. By further rotating the hand-wheel, the brake beam is moved longitudinally toward the hand-wheel causing a functioning of the brake shoes and connecting links identical to that described above. The movement of the brake beam 4 causes compression of the coil spring 34 in the same manner as when the piston head is operated in the cylinder and, by rotating the hand-wheel 19 in the opposite direction, a reversal of the direction of movement of the brake beam 4 will thus be effected by the release of the spring 34.

When two locomotives are operated in tandem they are connected back to back and the cable 21a that is secured to the bell crank 21 is passed beneath the bumpers (not shown) of both locomotives and attached to the bell crank 21 of the second locomotive. By operating the hand wheel 19 on one locomotive to apply the brakes, a force is exerted upon the bearing 20 by the collar 22 which force is transmitted by the bell crank 21 and the cable 21a to the bell crank 21 and bearing 20 of the second locomotive. The bearing 20 in turn exerts a force upon the collar 22 and subjects the shaft 16 to tension stresses substantially equal to the tension in the shaft 16 of the first locomotive. It is then evident that by operating the hand wheel 19 on either locomotive uniform braking pressure may be applied to both locomotives simultaneously.

It will be noted that the trunnion 5 is adapted to slide longitudinally along the sleeve 11 by virtue of its spline engagement therewith, but the sleeve 11 remains stationary when pressure is applied to the piston head. On the other hand the trunnion, piston and connecting links 5, 31 and 9, respectively, operate precisely the same when the brake beam is hand operated through the screw shaft 16 as when it is actuated through the fluid-pressure actuating device.

It will be evident from the above description of my invention that a brake mechanism made in accordance therewith provides a simple, durable and efficient means of braking a railway vehicle. The combination of a manually and mechanically operated brake mechanism is highly desirable for some kinds of service, such as in mine locomotive operation.

Although I have described a specific embodiment of my invention, it will be obvious to those skilled in the art that various modifications may be made in the details of construction, proportion and design of the several cooperating parts to adapt it to some particular service requirements without departing from the principles herein set forth.

I claim as my invention:—

1. A brake mechanism comprising a plurality of shoes, a brake beam, links connecting said shoes and beam, a trunnion mounted centrally of said beam, a sleeve provided with an internal screw thread being slidably mounted in said trunnion and beam, a screw shaft disposed in said sleeve and engaging the internal thread thereof, a fluid-pressure-actuated device linked to said trunnion, and means for independently actuating said fluid pressure device and said screw shaft.

2. A brake mechanism comprising a plurality of brake shoes, a brake beam, links connecting said shoes and beam, a trunnion mounted centrally of said beam, a sleeve provided with an internal screw thread being slidably mounted in said trunnion and beam, a screw shaft having a hand-wheel on one end thereof in screw-thread engagement with said sleeve, a cylinder mounted in co-operative alinement with said trunnion, a piston in said cylinder, a plurality of links connecting said piston and said trunnion, means for actuating said piston to operate said brake shoes, and means associated therewith for releasing said shoes.

3. A brake mechanism comprising a plurality of brake shoes, a brake beam, links connecting said shoes and beam, a trunnion mounted centrally of said beam, a sleeve provided with an internal screw thread being slidably mounted in said trunnion and beam, a screw shaft having a hand-wheel on one end thereof in screw-thread engagement with said sleeve, a cylinder mounted in cooperative alinement with said trunnion, a piston in said cylinder, a plurality of links connecting said piston and said trunnion, and means associated with the piston for releasing the brake shoes, said releasing means functioning to release both screw and piston members.

4. A brake mechanism comprising a brake beam, a plurality of brake shoes in co-operative engagement therewith, a trunnion member mounted on said beam, a pressure-actuated device pivotally connected thereto, and a screw member extending through said trunnion and beam having a hand-wheel on one end thereof, said trunnion and screw member being adapted to actuate said beam.

5. A brake mechanism comprising a plurality of brake shoes, a brake beam, links connecting said shoes and beam, a trunnion mounted in said beam, a sleeve having a spline connection with said beam and trunnion, a piston pivotally connected to said trunnion, a screw associated with said sleeve, a spring element, mechanical means for actuating said piston against said spring element, and means for operating said screw against the same spring element to actuate said beam to operate and release said brake shoes.

In testimony whereof, I have hereunto subscribed my name this 4th day of October, 1923.

CHARLES N. F. KNAPE.